United States Patent
Bolosky et al.

(10) Patent No.: US 7,373,418 B2
(45) Date of Patent: *May 13, 2008

(54) WIRE PROTOCOL FOR A MEDIA SERVER SYSTEM

(75) Inventors: William J. Bolosky, Issaquah, WA (US); Craig M Dowell, Redmond, WA (US); Robert P. Fitzgerald, Redmond, WA (US); Steven P. Levi, Redmond, WA (US); Jan de Rie, Redmond, WA (US); Richard F. Rashid, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 597 days.

This patent is subject to a terminal disclaimer.

(21) Appl. No.: 10/931,074

(22) Filed: Aug. 31, 2004

(65) Prior Publication Data

US 2005/0117581 A1 Jun. 2, 2005

Related U.S. Application Data

(63) Continuation of application No. 09/754,913, filed on Jan. 3, 2001, now Pat. No. 6,865,610, which is a continuation of application No. 09/256,017, filed on Feb. 23, 1999, now Pat. No. 6,466,987, which is a continuation of application No. 08/569,380, filed on Dec. 8, 1995, now Pat. No. 6,339,794.

(51) Int. Cl.
*G06F 15/16* (2006.01)
(52) U.S. Cl. ..................... 709/233; 709/227
(58) Field of Classification Search ........ 709/200–203, 709/217–233
See application file for complete search history.

(56) References Cited

U.S. PATENT DOCUMENTS

| | | | |
|---|---|---|---|
| 4,319,353 A | 3/1982 | Alvarez, III et al. | |
| 5,274,782 A | 12/1993 | Chalassani et al. | |
| 5,377,327 A | 12/1994 | Jain et al. | |
| 5,404,523 A | 4/1995 | DellaFera et al. | |
| 5,432,798 A | 7/1995 | Blair | |
| 5,442,749 A * | 8/1995 | Northcutt et al. | 709/219 |
| 5,446,846 A | 8/1995 | Lennartsson | |
| 5,517,645 A | 5/1996 | Stutz et al. | |
| 5,541,911 A | 7/1996 | Nilakantan et al. | |
| 5,544,320 A | 8/1996 | Konrad | |
| 5,555,375 A | 9/1996 | Sudama et al. | |
| 5,603,091 A | 2/1997 | Linquist et al. | |

(Continued)

OTHER PUBLICATIONS

Tanenbaum, Andrew S., Computer Networks, 3rd ed., Prentice Hall PTR, Upper Saddle River, N.J. , 1996, pp. 16-44.

(Continued)

*Primary Examiner*—Moustafa Meky
(74) *Attorney, Agent, or Firm*—Lee & Hayes, PLLC

(57) ABSTRACT

A wire protocol provides message formats for creating multiple network connections between a media server and a client. These multiple network connections may include a control link connection for passing control information and a data funnel connection for passing data of multiple media. The data funnel connection may be a multipoint-to-point connection that connects multiple data servers with the client. The protocol facilitates multiple requests being concurrently outstanding and asynchronous processing of requests. The protocol is designed to exist on top of a transport protocol layer.

37 Claims, 8 Drawing Sheets

U.S. PATENT DOCUMENTS

| | | | |
|---|---|---|---|
| 5,621,734 A | | 4/1997 | Mann et al. |
| 5,630,049 A | | 5/1997 | Cardoza et al. |
| 5,659,596 A | * | 8/1997 | Dunn ...................... 455/456.1 |
| 5,675,742 A | | 10/1997 | Jain et al. |
| 5,724,578 A | * | 3/1998 | Morinaga et al. ........... 707/100 |
| 5,799,147 A | | 8/1998 | Shannon |
| 5,822,524 A | * | 10/1998 | Chen et al. ................. 709/203 |
| 5,828,835 A | | 10/1998 | Isfeld et al. |
| 5,852,713 A | | 12/1998 | Shannon |
| 5,854,893 A | | 12/1998 | Ludwig et al. |
| 5,864,682 A | | 1/1999 | Porter et al. |
| 6,339,794 B2 | * | 1/2002 | Bolosky et al. ............. 709/233 |

OTHER PUBLICATIONS

Digital Audio-Visual Council, DAVIC 1.0 Specification Part 1, Description of DAVIC Functionalities, Technical Report, Digital Audio-Visual Council, Geneva Switzerland, 1995-1996, pp. I-xii, 1-13, 15-29, 31-43, 45-61.

Digital Audio-Visual Council, DAVIC 1.1 Specification Part 07, High and Mid Layer Protocols, Technical Specification, Digital Audio-Visual Council, Geneva, Switzerland, 1995-1997, pp. ii-iv, 1-39, 41-172.

* cited by examiner

WIRE PROTOCOL FOR A MEDIA SERVER SYSTEM

RELATED APPLICATIONS

This is a continuation of U.S. patent application Ser. No. 09/754,913, filed Jan. 3, 2001, which is now U.S. Pat. No. 6,865,610. U.S. patent application Ser. No. 09/754,913 is a continuation of U.S. patent application Ser. No. 09/256,017, filed Feb. 23, 1999, which is now U.S. Pat. No. 6,466,987. U.S. patent application Ser. No. 09/256,017 is a continuation of U.S. patent application Ser. No. 08/569,380, filed Dec. 8, 1995, which is now U.S. Pat. No. 6,339,794. This continuation application claims priority to Dec. 8, 1995 which is the original filing date of the parent application that is now U.S. Pat. No. 6,339,794.

TECHNICAL FIELD

The present invention relates generally to computer systems and more particularly to a wire protocol for communications between a media server system and a client.

BACKGROUND OF THE INVENTION

The use of computer networks has been gaining popularity. Local area networks have become commonplace in business environments, and residential users have begun to connect to computer networks, such as the Internet. Multimedia applications that generate multiple media output, such as audio output and video output, have also been gaining popularity. As such, it is not surprising that there has been an increase in the number of multimedia applications available on computer networks. In general, multimedia data has been transported across computer networks using transport protocols such as TCP/IP, but there has been no protocol present on top of such transport protocols for facilitating efficient and useful communications between clients and multimedia servers.

SUMMARY OF THE INVENTION

The present invention overcomes the limitations of the prior art by adding an additional layer on top of a transfer protocol layer to facilitate communications between a client on a first computer and a media server on a second computer. In accordance with a first aspect of the present invention, a method is practiced in a computer network that has a media server for storing data and a client. Per this method, a wire protocol is provided that facilitates creation of connections between the media server and the client. The wire protocol is utilized to create a control connection between the media server and the client to facilitate exchange of control information. The wire protocol is also used to create a data connection between the media server and the client that facilitates the exchange of data between the media server and the client at a rate substantially equal to a rate at which the data is consumed by the client.

In accordance with another aspect of the present invention, a control connection is created to enable control information to pass between a media server and a client computer in a distributed system that are on separate computers. A data funnel connection is created to enable data to be transferred between the media server and the client at a rate substantially equal to the rate at which the client consumes data.

In accordance with an additional aspect of the present invention, a first request for service is sent from a client to a media server. The first request includes a first identifier that uniquely identifies the first request. A second request for service is also sent from the client to the media server. The second request includes a second identifier that uniquely identifies the second request and that differs from the first identifier. The media server asynchronously services the first request and returns an acknowledgment to the client. The acknowledgment includes the first identifier. The media server asynchronously services the second request and returns an acknowledgment that includes the second identifier.

In accordance with a further aspect of the present invention, a method of decreasing network traffic is practiced in a computer network that has a media server connected to a client via a network connection. Multiple messages are batched into a single message at the client. A single message is then sent from the client to the media server. The media server unbatches the multiple messages and processes each of the multiple messages.

In accordance with another aspect of the present invention, a method is practiced in a distributed system that has a media server for storing files holding data of multiple media, and a client for requesting service from the media server. A control connection connects the media server and the client to pass control information, and a data connection connects the media server and the client to pass data. Per the method of this aspect of the present invention, a read request message is sent from the client to the media server over the control connection. The read request message requests that data in a file of multiple media data stored at the media server be read and output to the client. A read request acknowledgment message is sent from the media server to the client over the control connection to acknowledge the read request message. The requested data is then forwarded from the media server to the client over the data connection.

In accordance with yet another aspect of the present invention, a write request message is sent from a client to a media server over a control connection. The write request message requests that data from the client be written into a file at the media server. A write request acknowledgment message is sent from the media server to the client over the control connection to acknowledge the write request message. The data to be written is forwarded from the client to the media server over the data connection, and the forwarded data is written into a file at the media server.

In accordance with a further aspect of the present invention, a computer system is part of a distributed system that has a media server for storing files that hold data of multiple media. The computer system includes a control connection generator for generating a bidirectional control connection between the media server and the computer system. The control connection enables control information to be passed between the media server and the computer system. The computer system also includes a data connection generator for creating a bidirectional data connection between the media server and the computer system. The data connection enables data to be passed between the media server and the computer system.

BRIEF DESCRIPTION OF THE DRAWINGS

The present invention will be described in more detail below relative to the following figures.

DETAILED DESCRIPTION OF THE INVENTION

The preferred embodiment of the present invention provides a wire protocol on top of a transport layer to facilitate communications between a media server system and a client. The wire protocol of the preferred embodiment provides a number of messages that simplify communication between the client and the server and provide functionality that is well-suited for interaction with the media server system. For example, the wire protocol enables multiple network connections to be established between a client and the media server system. In particular, a control link connection may be established to facilitate the communication of control information between the media server system and the client, and a data link connection may be established to facilitate the transfer of data between the client and the server. The wire protocol facilitates multiple requests for service from the server to be concurrently outstanding. These requests are handled in an asynchronous fashion. A unique identification, denoted as an "incarnation," is included with each request and response to disambiguate responses to requests. In other words, the incarnation enables a response to be matched with a request. The wire protocol also enables multiple messages to be batched together in a single message that may be transmitted over the network in a single packet rather than in separate packets, thus reducing network traffic. The preferred embodiment is well adapted for use with data files that contain data of different media. Nevertheless, the present invention may also be used with single medium data files.

Figure 1:
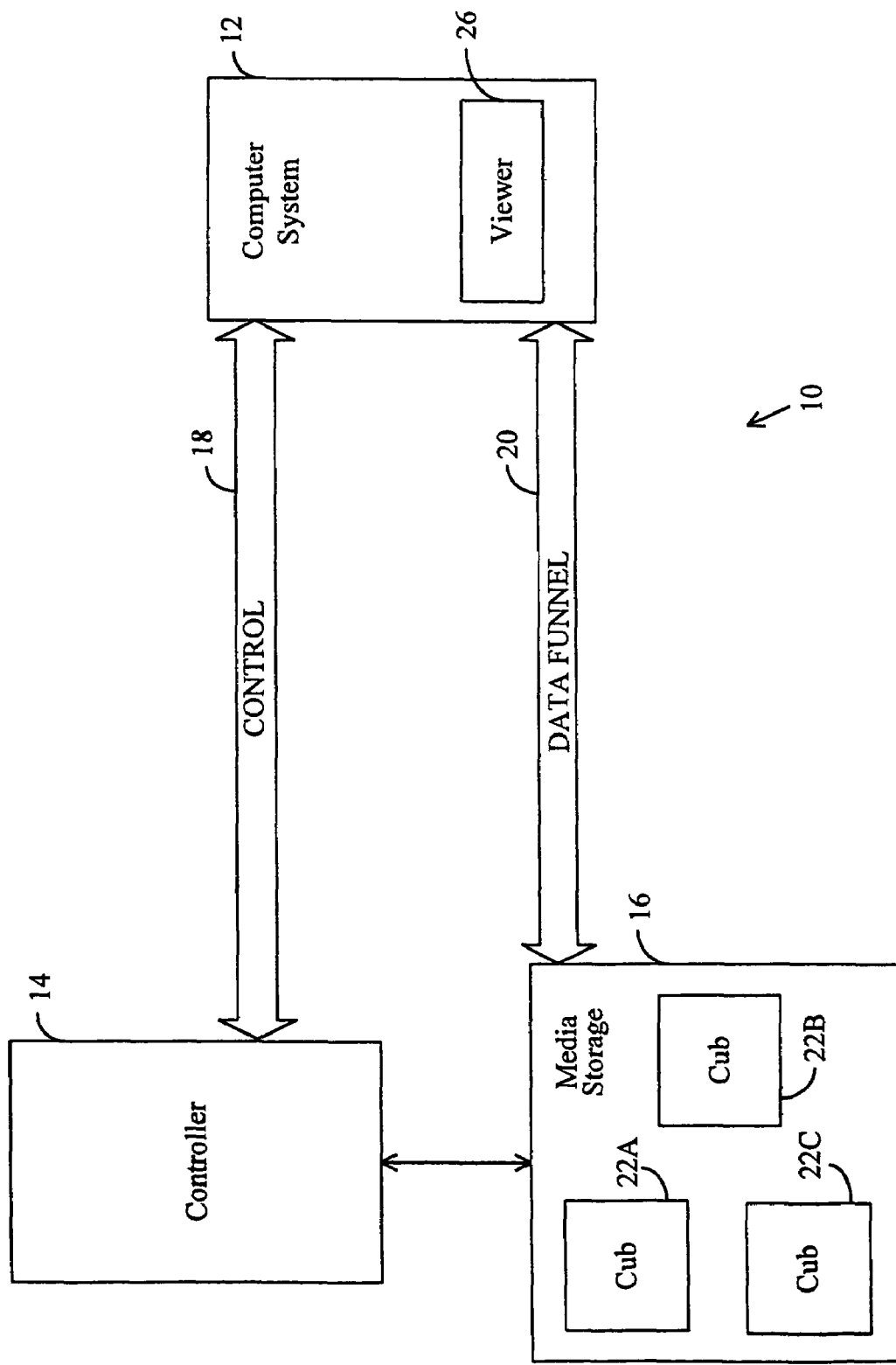
FIG. 1 is a block diagram of a distributed environment that is suitable for practicing the preferred embodiment of the present invention.

FIG. 1 is a block diagram depicting a networked environment 10 that is suitable for practicing the preferred embodiment of the present invention. The networked environment 10 includes a computer system 12 that is connected to a controller 14 for a media server system. The computer 14 may be one of numerous controllers in the system that are provided to enhance fault tolerance and to help in load balancing. The controller 14 controls access to media storage 16 which stores files holding data of multiple media. The computer system 12 is connected to the controller 14 via control link 18. The control link 18 is a bidirectional logical connection that facilitates messages being passed between the controller 14 and the computer system 12. The computer system 12 is also connected to the media storage 16 via a data funnel 20. The data funnel 20 is a bidirectional logical connection that connects the respective media storage managers, denoted as cubs, 22A, 22B and 22C, with the computer system 12. These logical connections are established on top. of one or more physical connectors, such as an "ETHERNET" wire, a phone line or fiber optic line. The wire protocol facilitates the creation of the control link 18 and the data funnel 20, as will be described in more detail below. The computer system 12 runs code 26 that constitute a viewer 26 for viewing output that is read from media storage 16. The viewer 26 acts as a client of the multimedia system formed by the controller 14 and the media storage 16. Those skilled in the art will appreciate that the viewer 26 may be part of an application program, part of an operating system, or, alternatively, part of a dynamic link library (DLL) module. The viewer 26 includes support for the wire protocol of the preferred embodiment.

As was mentioned above, the wire protocol of the preferred embodiment of the present invention facilitates multiple network connections to be established to service requests. The first connection is the control link 18, and the second connection is the data funnel 20. The control link 18 uses the TCP/IP protocol to send commands in the form of messages between the viewer 26 and the controller 14, and the data funnel 20 relies upon the UDP protocol to transfer data between the viewer and the controller (although the TCP/IP protocol may be used as well). Nevertheless, those skilled in the art will appreciate that different transport layer protocols may be utilized. The controller 14 and viewer 26 use the UDP datagram protocol to package blocks of data that are sent over the data funnel 20. Other datagram protocols may also be used by the present invention. It should be appreciated that the data funnel 20 is a multipoint-to-point connection that connects each of the cubs 22A, 22B and 22C to the computer system 12. It should be also appreciated that the present invention may include multiple clients and multiple media server systems. A single viewer and a single multimedia server system are depicted in FIG. 1 for purposes of clarity and simplicity.

In the preferred embodiment of the present invention, the cubs 22A, 22B and 22C hold multimedia data that may be played upon a request by a subscriber who uses the computer system 12. A more detailed description of such a multimedia on demand system is described in U.S. Pat. No. 5,473,362, which is explicitly incorporated by reference herein.

Multiple messages may be batched into a single message structure for transmission over the control link 18. A batch of messages starts with a header that contains the length of the batch of messages. The header is followed by a list of messages that are concatenated. Each of the messages begins with a header that describes the size of the message and the type of message. Each message that is sent over the control link 18 has the following format:

```
struct      LinkMessage {
int         chunkLen;
```

```
    int            MID;
}
```

The chunkLen field specifies the length of the message in 8-byte units. The MID field is a message identifier. A message identifier is a numerical value that specifies a message type, where each message type has a unique numerical value associated with it.

Figure 2:
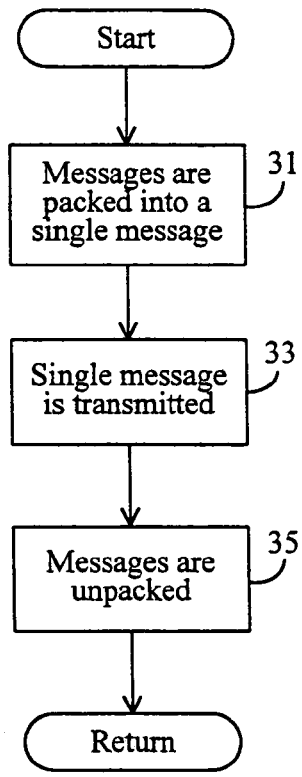
FIG. 2 is a flowchart illustrating the steps that are performed to send batched messages in accordance with the preferred embodiment of the present invention.

FIG. 2 is a flowchart illustrated in the steps are performed to batch messages that are sent to the control link 18. First the messages are packed into a single message (step 31 in FIG. 2). The single message is then transmitted over the control link 18 (step 33 in FIG. 2). The recipient of the message then unpacks the message (step 35 in FIG. 2). As noted above, the batch of messages starts with a header that contains the length of the batch. This header is followed by a concatenated list of messages, each of which contains its own header. Each message header identifies the size of the message, and, thus, these headers may be utilized in conjunction with the batch header to unpack the respective messages until no messages remain to be unpacked.

Figure 3:
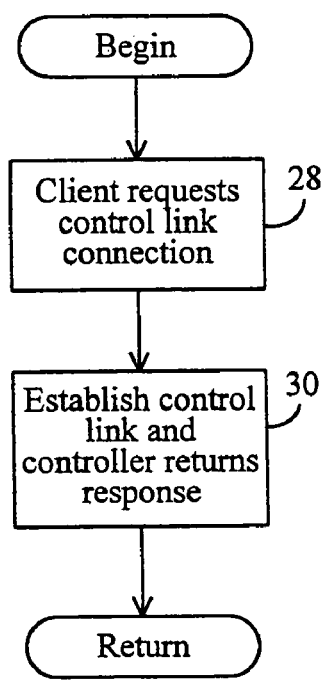
FIG. 3 is a flowchart that illustrates the steps that are performed to establish a control link between a client and a controller.

FIG. 3 is a flowchart that illustrates the steps that are performed to realize control link 18 between the viewer 26 and the controller 14 using the wire protocol of the preferred embodiment of the present invention. The viewer 26 initiates the creation of the control link 18 by requesting a control link connection (step 28 in FIG. 3). In particular, the viewer 26 sends a message to the controller 14 that has the following format.

```
struct LinkViewerToMacConnectMessage
    : public LinkMessage {
    int            MacToViewerProtocolRevision;
    int            ViewerToMacProtocolRevision;
    int            blackHole;
    char           subscriberName[ ];//length as required
};
```

The protocol revision fields of this message specify protocol revision numbers that identify which version of a protocol is being used. The fields of the message also specify the subscriber name. The controller 14 receives the request message from the viewer, establishes the control link and returns a response to the viewer to inform the viewer of the successful creation of the control link (step 30 in FIG. 3). The message that is returned to the viewer 26 has the following format.

```
struct LinkMacToViewerReportConnectedMessage
    : public LinkMessage {
    int            MacToViewerProtocolRevision;
    int            ViewerToMacProtocolRevision;
    Time           blockGroupPlayTime;
    unsigned       blockGroupBlocks;
    unsigned       nMaxOpenFiles;
    unsigned       nBlockMaxBytes;
    unsigned       maxBitRate;
};
```

The blockGroupPlayTime field is of the Time data type and specifies the amount of time it takes a consumer (e.g., viewer 26) of the block of data to render the block of data. It should be noted that the Time data type is a double precision floating point value. Each file of multiple media data is divisible into fixed size blocks. The blockGroupBlocks field specifies the number of blocks in a group. The nMaxOpenFiles field specifies the maximum number of files that may be concurrently opened by a single client on the multimedia server system formed by the controller 14 in media storage 16. The nBlockMaxBytes field specifies the maximum block size in bytes. Lastly, the maxBitRate field specifies the maximum bit rate of transmission of the blocks.

Figure 4:
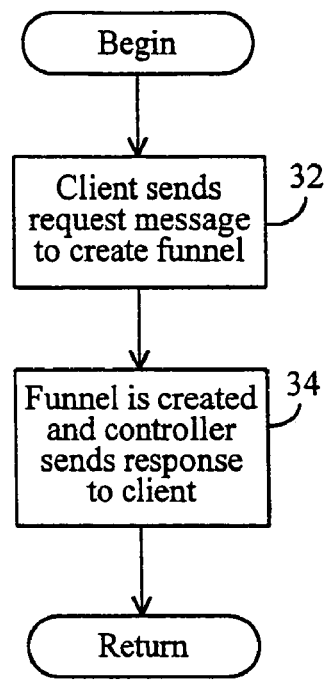
FIG. 4 is a flowchart that illustrates the steps that are performed to establish a data funnel connection between a client and data servers in a media storage.

The data funnel 20 is created by passing messages in accordance with the wire protocol of the preferred embodiment of the present invention. FIG. 4 is a flowchart illustrating the steps that are performed to create the funnel connection 20. Initially, the viewer 26 sends a request message to create a funnel to the controller 14 (step 32 in FIG. 4). The request message has the following format.

```
struct LinkViewerToMacConnectFunnelMessage
    : public LinkMessage {
    unsigned       maxBlockBytes;
    unsigned       maxFunnelBytes;
    unsigned       funnelMode;
    char           funnelName[ ];//length as required
};
```

The maxBlockBytes field specifies the maximum number of bytes in a block that the viewer desires. The maxFunnelBytes field specifies the maximum number of bytes per network datagram that is sent across the funnel connection. The funnelMode field identifies the current mode as "read," "write" or "read/write." Lastly, the funnelName field holds the characters and the name of the funnel specifies the type of transport being used.

The controller 14 receives the viewer request message and creates the appropriate data funnel connection (step 34 in FIG. 4). The controller 14 sends a response message back to the viewer 26 to indicate that the funnel has been successfully created. The response message has the following format.

```
struct LinkMacToViewerReportConnectedFunnelMessage
    : public LinkMessage {
    char           funnelName[ ];//length as required
};
```

As can be seen, the message specifies the name of the funnel. If for some reason, the controller 14 is unable to create the data funnel connection 20, the controller sends a ReportDisconnectedFunnelMessage (which is described in more detail below).

Figure 5:
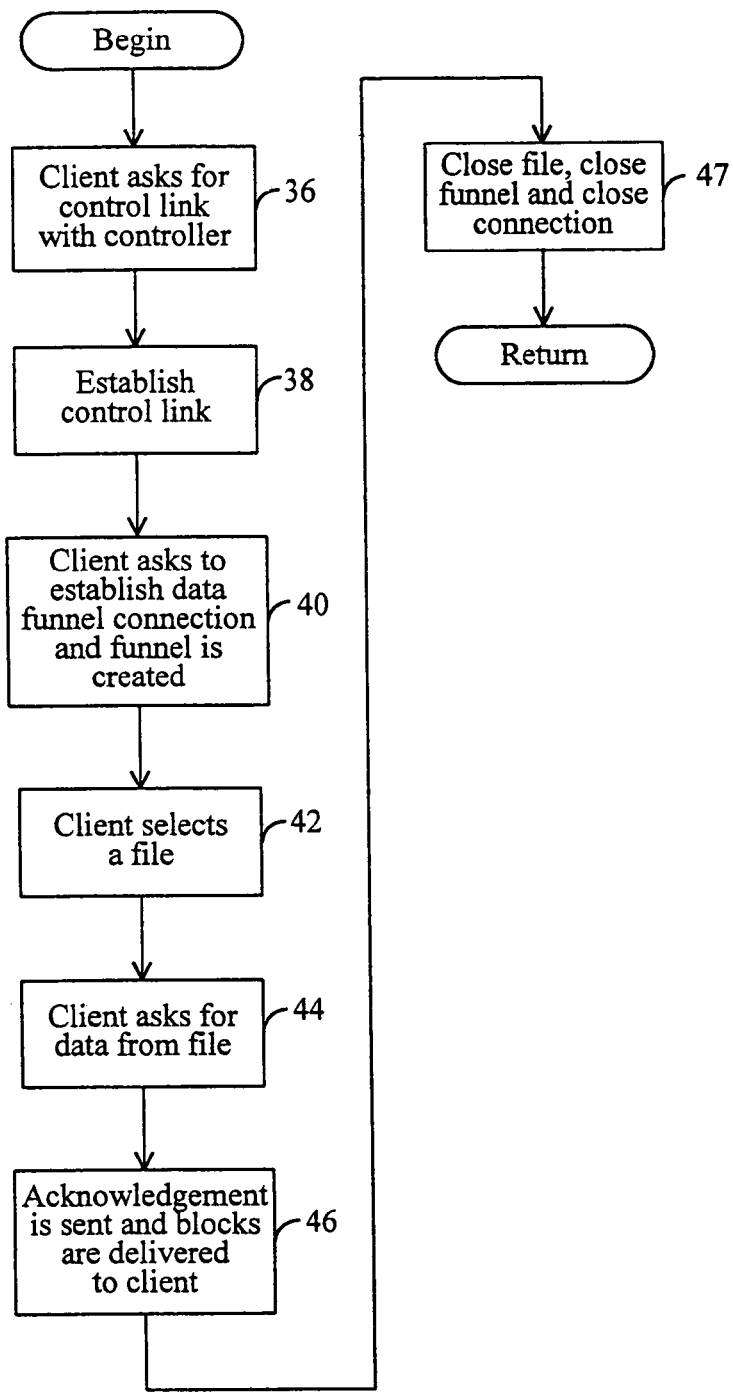
FIG. 5 is a flowchart illustrating the steps that are performed for a client to read a file of data stored on a media server system in the preferred embodiment of the present invention.

The wire protocol also enables the viewer 26 to request the playing of a data sequence by the multimedia server system on behalf of the viewer so that the multimedia output is delivered from the media storage 16 to the viewer 26. FIG. 5 is a flowchart illustrating the steps that are performed to initiate such playing of a multimedia sequence. Initially, the viewer 26 asks for the creation of a control link with the controller 14 by sending the LinkViewerToMacConnectMessage (described above) to the controller (step 36 in FIG. 5). The controller 14 then establishes the control link 18 (step 38 in FIG. 5). The. controller 14 then sends the LinkMacToViewerReportConnectedMessage (described above) to the viewer 26. If the control link 18 is already established, these steps are not necessary. The viewer 26 next asks the controller 14 to establish a data funnel connection 20 by sending the LinkViewerToMacConnectFunnelMessage (described above) to the controller 14. The data funnel connection is created and the LinkMacToViewerReportConnectedFunnelMessage (described above) is sent from the controller 14 to the viewer 26 (step 40 in FIG. 5). These steps need not be repeated if a data funnel connection already exists.

The viewer 26 subsequently selects a file (step 42 in FIG. 5). The selected file must be opened. In order to open the file, the viewer 26 sends a request to open the file to the controller 14. The request message has the following format.

```
struct LinkViewerToMacOpenFileMessage
    : public LinkMessage {
    int             playIncarnation;
    char            completeFileName[ ];
};
```

The playIncarnation field specifies the incarnation for this request. As was discussed above, multiple requests may be concurrently outstanding and the requests are asynchronously handled. As a result, there must be a mechanism in place for matching responses with requests. The incarnation serves as a basis for identifying each request so that responses may be matched with requests.

The controller 14 receives the request to open the file, opens the file and sends a response message. The response message has the following format.

```
struct LinkMacToViewerReportOpenFileMessage
    : public LinkMessage {
    Win32Error      dwError;
    int             playIncarnation;
    unsigned        openFileId;
    unsigned        tigerFileId;
    unsigned        block0DiskId;
    unsigned        block0CubId;
    char            *name;
    MmsFileEntry    entry[1];
};
```

The dwError field specifies an error code which identifies which error occurred, if any, in opening the file. The playIncarnation field holds a play incarnation value. The openFileId field specifies a handle for the file that has been opened. The tigerFileId field specifies an ID associated with the file that has been opened. Different clients may receive different openFileId's for a same file but each will receive the same tigerFileId. The block0DiskId field identifies the Id of the storage disk that holds the first block of the file that has been opened. Similarly, the block0CubId holds the Id of the cub 22A, 22B and 22C which holds the first block of the file that has been opened. The name field holds the name of the file and the entry field holds a file entry having information about the file.

The viewer 26 must then identify that the file is to serve as the "current file." The "current file" is a variable value that is maintained by the controller 14 to determine to which file subsequent play/stop messages should refer. Thus, as part of the selection of a file, the viewer 26 sends a message that sets a value for the current file variable to be the file of interest. In particular, the viewer 26 sends a message with the following format.

```
struct LinkViewerToMacSetCurrentFileMessage
    : public LinkMessage {
    unsigned        openFileId;
};
```

The openFileId field holds a handle that uniquely identifies the file of interest.

Once these steps have been completed, the viewer may ask for data from the file to be played (step 44 in FIG. 5). This viewer 26 sends a message with the following format.

```
struct LinkViewerToMacStartPlayingMessage
    : public LinkMessage {
    Time            position;
    int             frameOffset;
    int             playIncarnation;
};
```

The position field specifies a position in the file where the viewer 26 is to begin playing. The frameOffset field is reserved and the playIncarnation field identifies the incarnation value for the play request.

The controller 14 returns a message to specify that playing has begun (see step 46 in FIG. 5). This message takes the following format.

```
struct LinkMacToViewerReportStartedPlayingMessage
    : public LinkMessage {
    Win32Error      dwError;
    int             playIncarnation;
    unsigned        tigerFileId;
    unsigned        numFileBlocks;
    unsigned        fileBlockId;
    unsigned        nextCubId;
    unsigned        numCubs;
    char            fileName[ ];//length as required
};
```

The dwError field specifies which error, if any, has occurred in initiating the playing of the file. The playIncarnation field specifies the play incarnation, and the tigerFileId field holds the tigerFileId for the controller 14. The numFileBlocks field specifies how many blocks are in the file. The fileBlockId field holds the Id for the block at which playing is initiated. The nextCubId field holds the Id of the cub 22A, 22B or 22C which will start playing the first block of the file. The numCubs field specifies the number of cubs 22A, 22B and 22C in the media storage 16. Lastly, the fileName field holds the name for the file that is being played.

All of the above-described messages are passed over the control link 18. The read data from the media storage 16 is passed over the data funnel 20 (see step 46 in FIG. 5). The media storage 16 begins forwarding blocks of the file of data to the viewer 26 over the data funnel 20 (step 46 in FIG. 5). The blocks are delivered asynchronously from the cubs 22A, 22B and 22C of the media storage 16 over the data funnel 20 to the viewer 26.

The messages are transferred as datagrams, where a datagram is a group of one or more packets that logically represent a single message. A packet is a single unit that is transmitted by the network hardware. The size of packets may vary. For example, in an "ETHERNET" network, packets may range in size from about 20 bytes to about 1500 bytes, whereas in an ATM network, the packets may range from 48 bytes to about 64 kilobytes. When a datagram contains more than one packet it is said to be "fragmented" and the packets that make up the datagram constitute "fragments."

In a heterogeneous network, it is possible that different pieces of the network have different maximum packet sizes. The use of datagrams helps to bridge between such networks. An application may control the datagram size, which is logically independent of the packet size. In one embodiment of the present invention, a 528 byte datagram size is chosen because it works well with a given file format on the Internet. Blocks of data are transmitted across the network in frames. For certain transport protocols, a frame is a datagram. In other transport protocols, a frame is an arbitrary size that correlates with the maxFunnelBytes value.

The blocks are transmitted in frames, and each frame includes a compressed funnel header having the following format.

```
struct CompressedFunnelFrameHeader {
    unsigned        frameOffset;
    unsigned        frameLength;
    int             playIncarnation;
    unsigned short  playSequence;
    unsigned short  fileBlockId;
    unsigned        chunkLength;
};
```

The frameOffset field specifies the offset at which the data begins relative to the beginning of the block. The frameLength field specifies the length of the frame. The playIncarnation field holds an incarnation for a play request. The playSequence field holds a value that identifies where the block fits into the playing sequence. The fileBlockId field holds a numerical identifier for the block that is held in the payload of the frame and the chunklength field holds the total amount of data to be sent for the block.

An example helps to illustrate how these fields are utilized. Suppose that a block of size 200 kilobytes is to be sent over the data funnel. The maximum datagram size is 128 kilobytes. The block of data is sent in two datagrams. The first datagram has a frame offset of 0, a frame length of 128 kilobytes, and a chunk length of 200 kilobytes. The first datagram contains the first 128 kilobytes of data in the block. The second frame has a frame offset of 128 kilobytes, a frame length of 72 kilobytes, and a chunk length of 200 kilobytes. The second datagram contains the remaining 72 bytes of the block.

The cubs 22A, 22B and 22C cause the blocks of the file to be delivered at a particular frequency based upon a datagram size being used for the data funnel 20 and the block play time. The blocks are delivered until end of file is reached, assuming no errors or other intervening requests (step 46 of FIG. 5).

The system must then clean up by first closing the file and then closing the funnel and control link connections, respectively (step 47). The file is closed by sending the following message from the viewer 26 to the controller 14.

```
struct LinkViewerToMacCloseFileMessage
    : public LinkMessage {
    unsigned        openFileId;
};
```

The message holds the file Id for the file to be closed.

The funnel 20 is closed by sending a disconnect message from the viewer 26 to the controller 14. The disconnect message has the following format.

```
struct LinkViewerToMacDisconnectFunnelMessage
    : public LinkMessage {
};
```

The controller 14 receives the disconnect message, disconnects the funnel and returns the following message.

```
struct LinkMacToViewerReportDisconnectedFunnelMessage
    : public LinkMessage {
    Win32Error      dwError;
};
```

The dwError field specifies whether an error occurred in disconnecting the data funnel 20. If for some reason, such as a problem in the underlying network, the data funnel 20 closes, the controller 14 generates a disconnected funnel message without a recipient request to close the data funnel from the viewer 26.

The control link 18 is disconnected using mechanisms provided by the TCP/IP protocol. Those skilled in the art will appreciate that the control link 18 and funnel 20 need not be disconnected immediately after the file is no longer playing; rather, these connections may remain intact to be used further.

Typically, a file is played until end of file is reached. However, the viewer 26 may terminate the playing of a file by sending the following message.

```
struct LinkViewerToMacStopPlayingMessage
    : public LinkMessage {
};
```

When the controller 14 receives this message, the controller terminates the playing of the file so that the blocks of the file are no longer transmitted over the funnel 20.

A file may also stop playing in situations where an error or other event forces the termination of the playing of the file.

The preferred embodiment of the present invention is not limited to playing the whole file but rather facilitates the playing of blocks of a file on a block-by-block basis. In particular, the viewer 26 may request that a particular block or portion of a block of a file be played. The viewer 26 makes a request to play a block by sending the following message to the controller 14 (step 51 in FIG. 6).

```
struct LinkViewerToMacReadBlockMessage
    : public LinkMessage {
        unsigned        openFileId;
        unsigned        fileBlockId;
        unsigned        offset;
        unsigned        length;
        unsigned        flags;
        Time            tEarliest;
        Time            tDeadline;
        int             playIncarnation;
        int             playSequence;
    };
```

The openFileId field holds the Id for the file from which the block is to be read. The fileBlockId field holds the Id of the block that is to be read. The offset field specifies the offset within the block of the portion requested to be played. The length field specifies the number of bytes to send. If the viewer 26 requests that data beyond the end of the block be sent (because offset length is greater than or equal to block size), the controller 14 reduces the length field so that only valid data will be sent part of the flags field is used for system debugging information and the remainder is reserved for future use. The tEarliest field specifies the earliest time at which the block may be scheduled to be read, and the tDeadline field specifies the latest time at which the block may be read. The playIncarnation field specifies the incarnation for the request, and the playSequence field specifies where the read block request fits into a sequence of block read requests.

In response to the viewer 26 request, the controller 14 sends an acknowledgment message to the viewer 26 and reads the requested block of information. The acknowledgment message takes the following form.

```
struct LinkMacToViewerReportReadBlockMessage
    : public LinkMessage {
        Win32Error      dwError;
        int             playIncarnation;
        int             playSequence;
    };
```

The dwError field specifies an error code which indicates which error, if any, occurred during the reading of the block of the file. The playIncarnation field holds the play incarnation value, and the playSequence field holds the value that identifies where the block fits within a play sequence.

The viewer 26 may also explicitly request the cancellation of one or more read block requests by sending the following message.

```
struct LinkViewerToMacCancelReadBlockMessage
    : public LinkMessage {
        int             playIncarnation;
    };
```

The cancellation request message specifies the play incarnation associated with the request.

Figure 6:
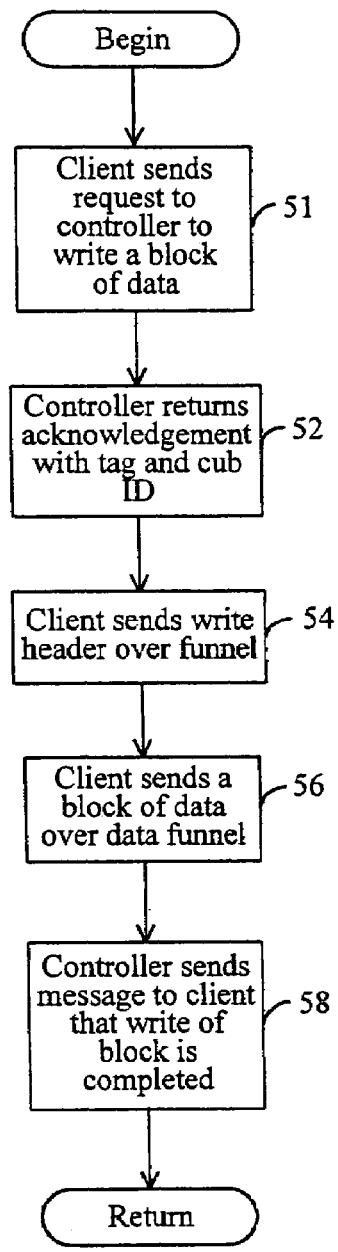
FIG. 6 is a flowchart illustrating the steps that are performed for a client to write data into a file that is stored on the media storage system in the preferred embodiment of the present invention.

The preferred embodiment of the present invention also enables a viewer 26 to write data to the media storage 16. FIG. 6 is a flowchart illustrating the steps that are performed in such a writing operation. Initially, the viewer 26 sends a request to the controller 14 to write a block of data (step 51 in FIG. 6). It is assumed that the viewer 26 has already allocated a file on the storage media 16. In order to allocate a file, the viewer 26 sends the following message.

```
struct LinkViewerToMacAllocateFileMessage
    : public LinkMessage {
        int             playIncarnation;
        char            newName;
        MmsFileEntry    newMmsFileEntry[1];
    };
```

The playIncarnation field specifies a play incarnation for allocating the file. The newName field identifies the file name for the new file and the newMmsFileEntry field holds file information.

The controller 14 receives the request to allocate a file, attempts to allocate the file, and sends the following response message:

```
struct LinkMacToViewerReportAllocatedFileMessage
    : public LinkMessage {
        Win32Error      dwError;
        int             playIncarnation;
        unsigned        openFileId;
        unsigned        tigerFileId;
        unsigned        block0DiskId;
        unsigned        block0CubId;
    };
```

The dwError holds an error code that specifies whether an error occurred and identifies any error that did occur. The playIncarnation field specifies a play incarnation value. The openFileId field holds a handle for the file that has been allocated. The tigerFileId holds an id for the file. The block0DiskId field holds the id of the disk that holds the first block of the file that has been allocated. Lastly, the block0CubId field holds the value of the id for the cub that holds block 0 of the allocated file.

Once the file is allocated and opened, the viewer 26 may request that a block be written to the file by sending the following message.

```
struct LinkViewerToMacWriteBlockRequestMessage
    : public LinkMessage {
        unsigned        openFileId;
        unsigned        fileBlockId;
        unsigned        numBlockBytes;
        int             playIncarnation;
    };
```

The openFileId field specifies the file Id for the file to which the block of data is to be written. The fileBlockId field holds an Id for the file block that is to be written. The numBlockBytes field specifies the number of bytes in the block, and the playIncarnation field holds the incarnation value for the write operation. The controller 14 sends a message to the cubs 22A, 22B and 22C to prepare for the data to be written. The controller 14 returns an acknowledgment to the viewer 26 that contain the tag and an identifier for the cub that holds the file to which the block of data is to be written (step 52 in FIG. 6). The acknowledgment message has the following format.

```
struct LinkMacToViewerReportWriteBlockRequestedMessage
    : public LinkMessage {
        Win32Error          dwError;
        int                 playIncarnation;
        unsigned            operationTag;
        unsigned            cubId;
        Time                wbStamps[1+WBStampRequestedOnTiger];
};
```

The dwError field holds an error code that either identifies an error or indicates that no error occurred during the request for the write block. The playIncarnation field holds a value for the play incarnation. The operationTag identifies the operation being performed because multiple operations may be performed at the same time. The cubId field identifies the cub to which the block is to be sent, and the final field is a set of time stamps.

The viewer 26 then sends a funnel write data header over the funnel 20 to the appropriate cub (step 54 in FIG. 6). The funnel write data header has the following format.

```
struct FunnelWriteDataHeader {
    unsigned        operationTag;
    int             playIncarnation;
    unsigned        numBlockBytes;
};
```

The operationTag field specifies a tag that identifies the operation to differentiate it from other operations. The playIncarnation field holds the current play incarnation value and the nunBlockBytes field holds the number of blocks being sent in the write block. The viewer sends the block of data over the funnel to the appropriate cub (step 56 in FIG. 6). When the writing is completed, the controller 14 sends a message to the viewer 26 indicating that the write of the block is completed (step 58 in FIG. 6). This acknowledgment message has the following format.

```
struct LinkMacToViewerReportWriteBlockCompletedMessage
    : public LinkMessage {
        Win32Error          dwError;
        int                 playIncarnation;
        Time                wbStamps[1+WBStampWrittenOnTiger];
};
```

The acknowledgment specifies an error code, a play incarnation and a set of time stamps.

Figure 7:
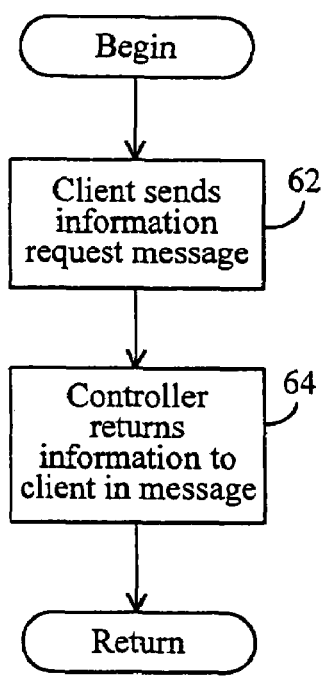
FIG. 7 is a flowchart illustrating the steps that are performed to obtain requested information for a client in accordance with the preferred embodiment of the present invention.

The protocol also facilitates the viewer 26 sending a request to obtain information from the controller 14. FIG. 7 is a flowchart of the basic steps that are performed. Initially, the viewer 26 sends an information request message to the controller 14 over the control link 18 (step 62 in FIG. 7). The controller 14 then returns information to the viewer in the form of a response message (step 64 in FIG. 7).

In order to understand the utility of the steps shown in FIG. 7, it is helpful to review some of the messages that may be sent to request information and to provide requested information. For example, the viewer 26 may request information about a particular controller 14 by sending the following message.

```
struct LinkViewerToMacTigerInfoMessage
    : public LinkMessage {
        char            tigerName[ ];//length as required
};
```

The viewer 26 may also request information about the funnel 20 by sending the following message.

```
struct LinkViewerToMacFunnelInfoMessage
    : public LinkMessage {
};
```

The controller 14 receives the request from the viewer 26 and returns the following message.

```
struct LinkMacToViewerReportFunnelInfoMessage
    : public LinkMessage {
        unsigned        transportMask;
        unsigned        nBlockFragments;
        unsigned        fragmentBytes;
        unsigned        nCubs;
        unsigned        failedCubs;
        unsigned        nDisks;
        unsigned        decluster;
        unsigned        cubddDatagramSize;
};
```

The transportMask field is a bit mask that specifies which transports are supported. The nBlockFragments field specifies the number of fragments that may be in a block (in this context "fragments" refers to portions of the data block on secondary storage). The fragmentBytes field specifies the number of bytes in each fragment. The nCubs field specifies the number of cubs in the media storage 16 that are connected via the data funnel 20, and the failedCubs field is a bit mask that specifies whether any of the cubs have failed or not. The nDisks field specifies the number of disks in the media storage 16. The decluster field specifies how information is mirrored in the media storage 16. Lastly, the cubddDatagramSize field specifies the datagram size that is utilized by the cubs 22A, 22B and 22C.

The viewer 26 may request information about a particular file by sending the following message.

```
struct LinkViewerToMacFileInfoMessage
    : public LinkMessage {
        int             playIncarnation;
        char            completeFileName[ ];//length as required
};
```

The message specifies a playIncarnation and a FileName. The controller 14 responds by returning the following report message.

```
struct LinkMacToViewerReportFileInfoMessage
    : public LinkMessage {
        Win32Error      dwError;
        int             playIncarnation;
```

-continued

```
        MmsFileEntry    entry[1];
};
```

The report message includes an entry that holds information about the file as well as a playIncarnation value and an error code.

In addition to obtaining information about a file, the viewer 26 may also obtain directory information from the controller 14 by sending a request for directory information having the following format.

```
        struct LinkViewerToMacDirectoryEntriesMessage
            : public LinkMessage {
            char        *tigerName;
            int         incarnation;
            unsigned    nPatterns;
            unsigned    startingFileId;
            char        *patterns[nPatterns];
        };
```

The message specifies the controller (i.e., tiger) in which the directory entries are maintained. An incarnation value for the request is included in the message, and the number of patterns to be searched is specified in the nPatterns field. It should be appreciated that this request does a textual search to look for certain textual patterns among the directory entries. The *patterns[nPatterns] field specifies the patterns that are to be sought. The starting file ID specifies where in a list of files the search is to begin.

The controller 14 receives the request for directory information and returns a report. The report message has the following format.

```
        struct LinkMacToViewerReportDirectoryEntriesMessage
            : public LinkMessage {
            int                 incarnation;
            unsigned            nFiles;
            unsigned            nValid;
            unsigned            nInitialized;
            unsigned            nBlocks;
            unsigned            nFree;
            unsigned            nEntries;
            int                 complete;
            TigerDirectoryEntry entries[nEntries];
        };
```

The report message includes the incarnation value to delineate this response from other responses and to match up the response with the request. The nFile field specifies the number of files in the system. The nValid field specifies the number of files that are valid, and the nInitialized field specifies the number of files that have been initialized. The nBlocks field specifies the number of blocks on the media server system. The nFree field specifies the number of free blocks and the nEntries field specifies the number of directory entries in this message that match the patterns that were requested. The complete field specifies whether the end of the response to the request for directory entries is contained in the message. Oftentimes the response is too large for one message and must be broken into multiple messages. Lastly, the entries[nEntries] field is an array for each matching directory entry that describes the directory entry.

The viewer 26 may also request a number of administrative functions be performed at the controller 14. For example, the viewer 26 may request that a file be removed from the storage on one of the cubs 22A, 22B and 22C. The viewer initiates a request by sending a message with the following format.

```
        struct LinkViewerToMacRemoveFileMessage
            : public LinkMessage {
            int         playIncarnation;
            char        fileName[ ];//length as required
        };
```

This format specifies a play incarnation and a file name. The controller 14 receives the request and attempts to perform the request. The controller 14 then returns a message with the following format.

```
        struct LinkMacToViewerReportRemovedFileMessage
            : public LinkMessage {
            Win32Error      dwError;
            int             playIncarnation;
        };
```

The report message indicates whether the removal of the file was successful and also returns to the play incarnation so as to disambiguate this report message from other report messages.

A viewer may request that a file be renamed. Specifically, the viewer sends a message with the following format.

```
        struct LinkViewerToMacRenameFileMessage
            : public LinkMessage {
            int         playIncarnation;
            char        *newName;
            char        oldName[ ];//length as required
        };
```

This message includes the old name of the file, the new name of the file to which the file is to be renamed and a play incarnation value. The controller 14, in response, attempts to rename to the file and sends a report message having the following format.

```
        struct LinkMacToViewerReportRenamedFileMessage
            : public LinkMessage {
            Win32Error      dwError;
            int             playIncarnation;
        };
```

The report message specifies whether an error occurred and returns a play incarnation value.

A viewer 26 may also request that a file be initialized so that the file is at a state that is ready to be played. The viewer 26 sends such a request by sending a message with the following format.

```
struct LinkViewerToMacInitializeFileMessage
    : public LinkMessage {
        int             playIncarnation;
        unsigned        openFileId;
};
```

The request message includes a play incarnation value and a file ID for the file that is to be initialized. The controller 14 responds by attempting to initialize the file and returning a request message that specifies whether the initialization was successful or not. The response message has the following format.

```
struct LinkMacToViewerReportInitializedFileMessage
    : public LinkMessage {
        Win32Error      dwError;
        int             playIncarnation;
};
```

Figure 8:
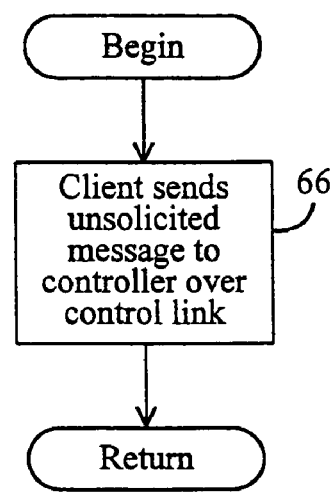
FIG. 8 is a flowchart illustrating the step that is performed for a client to unilaterally initiate an action via the wire protocol in accordance with the preferred embodiment of the present invention.

As shown in FIG. 8 the viewer may also send messages over their control link 18 that prompt no report message in return (step 66 in FIG. 8). One example of such a message is a message the viewer 26 sends to the controller 14 to indicate that the viewer did not receive a block that was transmitted over the data funnel 20. This message is especially useful because many protocols, such as UDP, cannot guarantee arrival of a data block. The message the viewer 26 sends has the following format.

```
struct LinkViewerToMacReportLostBlockMessage
    : public LinkMessage {
        int                 scheduled;
        BufferDataHeader    header[1];
};
```

The scheduled field specifies whether the block was scheduled as a block read or scheduled as part of a file read. The header field identifies the block.

The viewer may also send a message indicating that the block that was transmitted was damaged. The viewer 26 indicates such a damaged block by sending the following message to the controller 14.

```
struct LinkViewerToMacReportDamagedBlockMessage
    : public LinkMessage {
        BufferDataHeader    header[1];
};
```

This message includes the data header for the block that was damaged.

While the present invention has been described with reference to a preferred embodiment thereof, those skilled in the art will appreciate that various changes in form and detail may be made without departing from the intended scope of the present invention as defined in the appended claims.

The invention claimed is:

1. In a computer network with a client and a media server operatively communicating via the network, a message communications method comprising:

sending a control-link request message to the media server that requests establishment of communication between the client and media server via a control link;

establishing a control link between the client and the media server;

sending a funnel request message via the control link to the media server that requests establishment of communication between the client and media server via a data funnel, wherein the funnel request message comprises a block-maximum-size field specifying a maximum size of a block of data;

establishing a data funnel, wherein the data funnel is configured to facilitate transmission of data between the client and the media server using network datagrams.

2. A message communications method as recited in claim 1, wherein the control-link request message comprises a subscriber identifier field.

3. A computer-readable storage medium having instructions that are executable by a computer to perform steps as recited in claim 1.

4. In a computer network with a client and a media server operatively communicating via the network, a message communications method comprising:

receiving a control-link request message at the media server, wherein the control-link request message requests establishment of communication between a client and the media server via a control link;

establishing a control link between the client and the media server;

returning a control-link response message to the client from the media server that notifies the client of establishment of the control link;

receiving a funnel request message via the control link that requests establishment of communication between the client and media server via a data funnel;

establishing a data funnel, wherein the data funnel is configured to facilitate transmission of data between the client and the media server using network datagrams;

returning a funnel response message to the client from the server that notifies the client of establishment of the data funnel; and transmitting blocks of data from the media server to the client, wherein the funnel request message comprises a block-maximum-size field specifying a maximum size of a block of data.

5. A message communications method as recited in claim 4, wherein the control-link request message comprises a subscriber identifier field.

6. A message communications method as recited in claim 4, wherein the control-link response message further comprises:

a block-play-time field that specifies a rate at which a client may receive a block of data;

a block-maximum-size field specifies a maximum size of a block of data.

7. A message communications method as recited in claim 4, wherein the funnel request message comprises:

a maximum-funnel-size field that indicates a maximum size of a network datagram;

a funnel-mode field that indicates a read-write mode;

a funnel-name field that indicates a name of the funnel.

8. A message communications method as recited in claim 4, wherein the funnel response message comprises a funnel-name field that indicates a name of the funnel.

9. A computer-readable storage medium having instructions that are executable by a computer to perform steps as recited in claim 4.

10. A message manager for use in a network having a client, wherein the network is configured to facilitate communication via a control link and via a data funnel, wherein the data funnel is configured to facilitate transmission of data using network datagrams, the manager comprising:
   a media server for communicating to a client over the network using the control link and the data funnel, wherein the media server is further configured to transmit blocks of data to the client;
   the media server being configured to receive a control-link request message, to return a control-link response message to the client that notifies the client of establishment of the control link, to receive a funnel request message, and to return a funnel response message to the client that notifies the client of establishment of the data funnel,
   wherein the funnel request message comprises a maximum-block-size field that indicates a maximum size of a block of data.

11. A manager as recited in claim 10, wherein the control-link request message comprises a subscriber identifier field.

12. A manager as recited in claim 10, wherein the control-link response message comprises:
   a block-play-time field that specifies a rate at which a client may receive a block of data;
   a block-maximum-size field specifies a maximum size of a block of data.

13. A manager as recited in claim 10, wherein the funnel request message comprises:
   a maximum-funnel-size field that indicates a maximum size of a network datagram;
   a funnel-mode field that indicates a read-write mode;
   a funnel-name field that indicates a name of the funnel.

14. A manager as recited in claim 10, wherein the funnel response message comprises a funnel-name field that indicates a name of the funnel.

15. A message receiver for use in a network having a media server, wherein the network is configured to facilitate communication via a control link and via a data funnel, wherein the data funnel is configured to facilitate transmission of data using network datagrams, the receiver comprising:
   a client for communicating to a client over the network using the control link and the data funnel;
   the client being configured to send a control-link request message to the media server that requests establishment of communication between the client and media server via a control link and to send a funnel request message via the control link to the media server that requests establishment of communications between the client and media server via a data funnel,
   wherein the funnel request message comprises a maximum-block-size field that indicates a maximum size of a block of data.

16. In a computer network with a client and a media server operatively communicating via the network, a message communications method comprising:
   requesting a control link between the client and the media server;
   establishing such a control link;
   requesting a data funnel between the client and the media server;
   establishing such a data funnel;
   selecting a media file stored on media server;
   requesting delivery of the media file to the client by sending a deliver-file request message to media server, wherein the deliver-file request message comprises a position field that specifies a beginning position in the file from which delivery will begin.

17. A message communications method as recited in claim 16, further comprising sending a current-file message to the media server, wherein that message comprises a current-file field that identifies the file.

18. A message communications method as recited in claim 16, further comprising sending an open-file request message to the media server, wherein that message comprises an incarnation field that identifies the open-file request message and file-name field that indicates a name of the media file.

19. A message communications method as recited in claim 16, wherein the sending a deliver-file request message to media server further comprises:
   a play-incarnation field that identifies the deliver-file request message.

20. A message communications method as recited in claim 16, wherein the sending a deliver-file request message to media server further comprises:
   an open-file field that identifies the media file;
   a file-block field that identifies a block of the media file;
   an offset field specifies a position at which data of a block begins;
   a time-earliest field that indicates an earliest point in time to deliver a block of the file;
   a time-deadline field that indicates a latest point in time to deliver a block of the file;
   a play-incarnation field that identifies this deliver-file request message;
   a play-sequence field that indicates a block's position relative a sequence of blocks of the file.

21. A message communications method as recited in claim 16, further comprising sending deliver-file-request acknowledgement message, wherein the massage comprises:
   a play-incarnation field that identifies a deliver-file request message;
   one or more file-location fields that provide information that facilitates location of the media file on the media server;
   a file-name field that indicates a name of the media file.

22. A computer-readable storage medium having instructions that are executable by a computer to perform steps as recited in claim 16.

23. In a computer network with a client and a media server operatively communicating via the network, a message communications method comprising:
   receiving a request for a control link between the client and the media server;
   establishing such a control link;
   receiving a request for a data funnel between the client and the media server;
   establishing such a data funnel;
   opening a media file;
   receiving a request for delivery of the media file to the client by receiving a deliver-file request message to the media server, wherein the deliver-file request message comprises a position field that specifies a beginning position in the file from which delivery will begin;
   delivering the file to the client via the data funnel, wherein the file is divided into blocks of data.

24. A message communications method as recited in claim 23, further comprising receiving a current-file message to the media server, wherein that message comprises a current-file field that identifies the file.

25. A message communications method as recited in claim 23, further comprising receiving an open-file request message to the media server, wherein that message comprises an incarnation field that identifies the open-file request message and file-name field that indicates a name of the media file.

26. A message communications method as recited in claim 23, wherein the receiving a deliver-file request message to the media server further comprises:
   a play-incarnation field that identifies the deliver-file request message.

27. A message communications method as recited in claim 23, wherein the receiving a deliver-file request message to the media server further comprises:
   an open-file field that identifies the media file;
   a file-block field that identifies a block of the media file;
   an offset field specifies a position at which data of a block begins;
   a time-earliest field that indicates an earliest point in time to deliver a block of the file;
   a time-deadline field that indicates a latest point in time to deliver a block of the file;
   a play-incarnation field that identifies this deliver-file request message;
   a play-sequence field that indicates a block's position relative a sequence of blocks of the file.

28. A message communications method as recited in claim 23, further comprising receiving a deliver-file-request acknowledgement message, wherein the message comprises:
   a play-incarnation field that identifies a deliver-file request message;
   one or more file-location fields that provide information that facilitates location of the media file on the media server;
   a file-name field that indicates a name of the media file.

29. A message communications method as recited in claim 23, further comprising transmitting blocks of data, wherein the blocks are divided into frames.

30. A message communications method as recited in claim 29, wherein each frame includes a header comprising:
   a frame-offset field that specifies a position at which data of a frame begins;
   a frame-length field that specifies a length of a frame;
   a play-incarnation field that identifies a deliver-file request message;
   a play-sequence field that identifies a block's position relative to a sequence of blocks of the file.

31. A message communications method as recited in claim 30, further comprising sending a close-file message.

32. A message communications method as recited in claim 23, further comprising closing the file.

33. A message communications method as recited in claim 23, further comprising closing the data funnel.

34. A message communications method as recited in claim 33, further comprising sending a close-funnel acknowledgement.

35. A computer-readable storage medium having instructions that are executable by a computer to perform steps as recited in claim 23.

36. A computer-readable storage medium having instructions that are executable by a computer, in a computer network with a client and a media server operatively communicating via the network, to perform steps comprising:
   requesting a control link between the client and the media server;
   establishing such a control link;
   requesting a data funnel between the client and the media server;
   establishing such a data funnel;
   selecting a media file stored on media server;
   requesting delivery of the media file to the client; and
   transmitting blocks of data from the media server to the client,
   wherein the requesting a data funnel includes a block-maximum-size field specifying a maximum size of a block of data.

37. A computer-readable storage medium having instructions that are executable by a computer, in a computer network with a client and a media server operatively communicating via the network, to perform steps comprising:
   receiving a request for a control link between the client and the media server;
   establishing such a control link;
   receiving a request for a data funnel between the client and the media server;
   establishing such a data funnel;
   opening a media file;
   receiving a request for delivery of the media file to the client by receiving a deliver-file request message to the media server, wherein the deliver-file request message comprises a position field that specifies a beginning position in the file from which delivery will begin;
   delivering the file to the client via the data funnel, wherein the file is divided into blocks of data.

* * * * *

UNITED STATES PATENT AND TRADEMARK OFFICE
CERTIFICATE OF CORRECTION

| | | |
|---|---|---|
| PATENT NO. | : 7,373,418 B2 | Page 1 of 1 |
| APPLICATION NO. | : 10/931074 | |
| DATED | : May 13, 2008 | |
| INVENTOR(S) | : William J. Bolosky et al. | |

It is certified that error appears in the above-identified patent and that said Letters Patent is hereby corrected as shown below:

In column 20, line 38, in Claim 21, delete "massage" and insert -- message --, therefor.

Signed and Sealed this

Fifteenth Day of February, 2011

David J. Kappos
*Director of the United States Patent and Trademark Office*